(12) United States Patent
Takeuchi

(10) Patent No.: US 7,147,561 B2
(45) Date of Patent: Dec. 12, 2006

(54) GAME SYSTEM HAVING A PLURALITY OF GAME MACHINES FOR COMPETING FOR CARD DATA

(75) Inventor: Yasutaka Takeuchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 191 days.

(21) Appl. No.: 10/914,107

(22) Filed: Aug. 10, 2004

(65) Prior Publication Data
US 2005/0043093 A1 Feb. 24, 2005

(30) Foreign Application Priority Data
Aug. 20, 2003 (JP) ............................. 2003-296824

(51) Int. Cl.
*A63F 9/24* (2006.01)
(52) U.S. Cl. ....................................................... 463/40
(58) Field of Classification Search .................... 463/1, 463/29, 40, 42–44
See application file for complete search history.

(56) References Cited

U.S. PATENT DOCUMENTS

| | | | |
|---|---|---|---|
| 4,386,773 A | 6/1983 | Bronstein | |
| 4,856,787 A * | 8/1989 | Itkis ........................... | 273/237 |
| 4,861,031 A | 8/1989 | Simms | |
| 4,958,837 A | 9/1990 | Russell | |
| 5,026,058 A | 6/1991 | Bromley | |
| 5,067,079 A | 11/1991 | Smith, III et al. | |
| 5,190,285 A | 3/1993 | Levy et al. | |
| 5,212,368 A | 5/1993 | Hara | |
| 5,331,141 A | 7/1994 | Kaneko | |
| 5,411,259 A | 5/1995 | Pearson et al. | |
| 5,533,124 A | 7/1996 | Smith et al. | |
| 5,586,238 A | 12/1996 | Murata | |
| 5,625,534 A | 4/1997 | Okaya et al. | |
| 5,662,332 A | 9/1997 | Garfield | |
| 5,689,561 A | 11/1997 | Pace | |
| 5,791,988 A | 8/1998 | Nomi | |
| 5,816,920 A * | 10/1998 | Hanai ........................... | 463/42 |
| 5,855,001 A | 12/1998 | Doederlein et al. | |
| 5,902,991 A | 5/1999 | Kumar | |
| 5,959,281 A | 9/1999 | Domiteaux | |
| 5,962,839 A | 10/1999 | Eskildsen | |
| 6,200,216 B1 | 3/2001 | Peppel | |
| 6,234,389 B1 | 5/2001 | Valliani et al. | |
| 6,267,678 B1 | 7/2001 | Kubo et al. | |

(Continued)

FOREIGN PATENT DOCUMENTS

EP 0 572 710 12/1993

(Continued)

OTHER PUBLICATIONS

"Architecture for a Video Arcade Game Network." *IBM Technical Disclosure Bulletin*, Apr. 1991, 3 pages (pp. 138-141).

(Continued)

*Primary Examiner*—Kim Nguyen
(74) *Attorney, Agent, or Firm*—Nixon & Vanderhye, P.C.

(57) ABSTRACT

According to a game system and a storage medium having stored therein a game program of the present invention, among a plurality of game machines communicably connected to each other, a game machine 10a acting as a card reader machine reads card data and sends the card data to a game machine 10b. Game machines 10b to 10d compete against each other in a game and the card data is sent only to a specific game machine(s) 10 based on game results. That is, an amusing game is provided which uses card data to be sent as special prize data which is given only to a specific player(s).

18 Claims, 12 Drawing Sheets

U.S. PATENT DOCUMENTS

| | | | |
|---|---|---|---|
| 6,270,402 | B1 | 8/2001 | Fujioka et al. |
| 6,287,202 | B1* | 9/2001 | Pascal et al. ............... 463/42 |
| 6,322,077 | B1 | 11/2001 | Braunlich et al. |
| 6,379,253 | B1 | 4/2002 | Nishioka |
| 6,398,651 | B1 | 6/2002 | Yamada |
| 6,419,584 | B1 | 7/2002 | Sakamoto et al. |
| 6,468,162 | B1 | 10/2002 | Nakamura |
| 6,484,942 | B1 | 11/2002 | Yokoyama et al. |
| 6,547,662 | B1 | 4/2003 | Yamada |
| 6,554,702 | B1 | 4/2003 | Mahar et al. |
| 6,554,712 | B1* | 4/2003 | Takahashi ............... 463/43 |
| 6,612,501 | B1 | 9/2003 | Woll et al. |
| 6,735,324 | B1 | 5/2004 | McKinley et al. |
| 2001/0044337 | A1 | 11/2001 | Rowe et al. |
| 2002/0028710 | A1 | 3/2002 | Ishihara et al. |
| 2002/0042744 | A1 | 4/2002 | Kohl |
| 2002/0043764 | A1 | 4/2002 | Imhof |
| 2003/0022708 | A1 | 1/2003 | Yano et al. |
| 2006/0040746 | A1 | 2/2006 | Eguchi et al. |

FOREIGN PATENT DOCUMENTS

| | | |
|---|---|---|
| EP | 0 988 875 A2 | 3/2000 |
| EP | 0 988 875 A3 | 6/2002 |
| JP | 5-30475 | 5/1993 |
| JP | 9-062812 | 3/1997 |
| JP | 2001-198602 | 6/2001 |
| JP | 2001-331667 | 11/2001 |
| JP | 2001-334012 | 12/2001 |
| JP | 2002-263361 | 9/2002 |

OTHER PUBLICATIONS

Adams, "Bar Code 1, 2-Dimensional Bar Code Page", http://www.adams1.com/pub/russadam/stack.html, 12 pages, 1995-2003.

Xippix Inks Deal with Amazon.com; ImagePump Technology and Hosting Will be Available to Selected Sellers, Business Wire, p. 951, Jun. 6, 2000.

"Games that Never Made it to America", Nintendo Power, vol. 56, pp. 60-66, Jan. 1994.

Namcot Barcode Boy Set documents, 1992, Namco and Sofel, 6 pages of packaging, and Battle Space instructions booklet, 15 pages.

Conveni Wars Barcode Battler II, 1993, packaging and instructions, 15 pages.

Conveni Wars Barcode Battler II, 1993, instruction booklet, 14 pages and Super Mario World for Conveni Wars Barcode Battler II instruction booklet, 4 pages.

Namcot Barcode Boy instructions, 1992, 6 pages.

Nintendo Game Boy packaging, 1989. (2 pages).

"Barcode Battler Console Information" from www.consoledatabase.com (3 pages).

"Barcode Battler" from www.redshirt.co.uk (8 pages).

"Super Barcode Battler" from www.gamersgraveyard.com (2 pages).

"Epoch Barcode Battler" from www.heimcomputer.de (3 pages).

www.vidgame.net (1 page).

www.barcodebattler.free.fr (2 pages).

"Barcode Battler Peripherals" from www.snescentral.edgeemu.com (3 pages).

"Barcode Battler II Super Mario World" packaging (1 page).

"Conveni Wars Barcode Battler II" packaging (1 page).

"Barcode Eleven" from www.zappa.rainiac.com (1 page).

"Barcode Battler" from www.wolfgames.com (2 pages).

"Super Barcode Wars Multi Scanning System" packaging (1 page).

"Bandai 1992 Gundam Super Barcode Wars Game Set" from www.esdlife.toyeast.com (4 pages).

"DBZ: Barcode Battler" from www.planetnintendo.com (3 pages).

"Mortal Combat" packaging (2 pages).

"Tiger Super Street Fighter II Barcodzz" from www.handheldmuseum.com (1 page).

"Tiger—BARCODDZZ—The Adventures of Batman and Robin (163)" from www.retrotrader.com (2 pages).

www.atarihg.com (4 pages).

"Dragonball Super Barcode Wars Cards" from www.home.lgcy.com (1 page).

"PP CARDS" from www.radittzu.xom (7 pages).

"Muscara.com: Dragon Ball Japanese Cards" from www.muscara.com (3 pages).

"9 Dragonball Z Character Collection 1993 Card" from www.ebay.com.sg (2 pages).

"Dragon Ball Super Barcode Wars Part 2 Full Set (42pcs)" from www.hk.fl.page.auctions.yahoo.com (4 pages).

"Punch Card History" from Doug Jones's punch card history from www.cs.uiowa.edu/~jones/cards/history.html; (8 pages).

* cited by examiner

F I G. 4
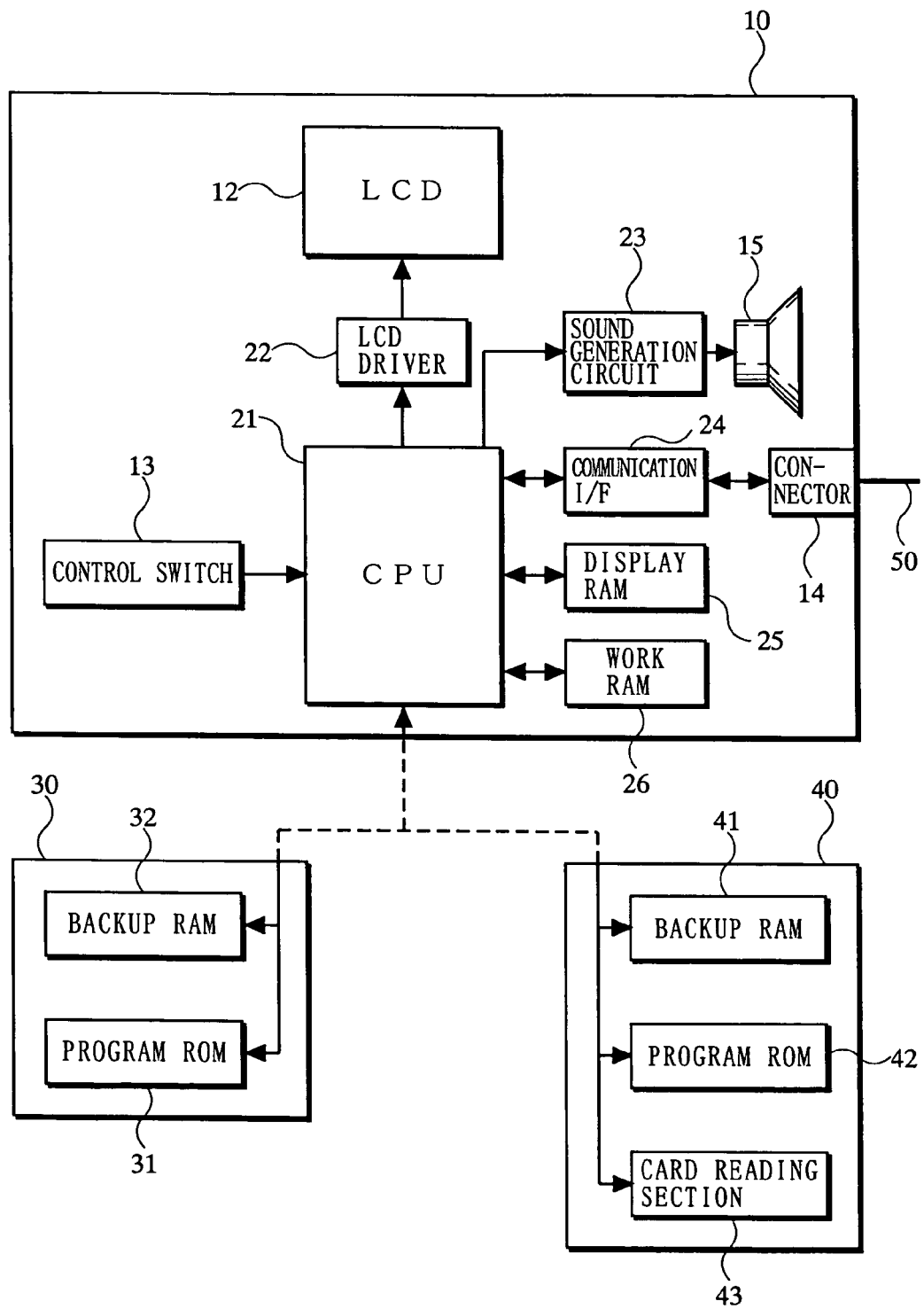

GAME SYSTEM HAVING A PLURALITY OF GAME MACHINES FOR COMPETING FOR CARD DATA

FIELD OF THE INVENTION

The illustrative embodiments relate to a game system and a storage medium having stored therein a game program. More particularly, the illustrative embodiments relate to a game system and a storage medium having stored therein a game program for executing a game which is played among a plurality of game machines connected to each other, for the purpose of competing for data which is provided externally through a medium such as a card and which, after the game, becomes usable only by a specific game machine(s).

BACKGROUND AND SUMMARY OF THE INVENTION

Conventionally, game machines are known which read a data area of a data card and display an image on a display screen in accordance with the content of a bar code which is the data area. In addition, as disclosed in Japanese Laid-Open Patent Publication Nos. 2001-334012 and 2002-263361, game machines are known which realize, for example, special player versus player games in accordance with the content of a read bar code.

On the above-described card, data is stored so as to be optically, electrically, or magnetically readable. For example, an optical storage method is as follow. With a block of a predetermined area being a unit, a plurality of blocks are collected in a scan direction to form a storage region. Then, dots are distributed over a two-dimensional array of blocks and the dots are printed on a predetermined region of a card so as to be distributed randomly, whereby data is stored. This storage method is hereinafter referred to as the "two-dimensional bar code storage method" and the printed data is hereinafter referred to as the "two-dimensional bar code".

To read data from a data card such as the two-dimensional bar code, generally a special card reader is used. A card reading apparatus is connected to a predetermined game machine via a connector. Then data of a data card is read by a player using the card reading apparatus and the data is incorporated into the game machine, whereby a game is provided which is playable with the card. Typically, the player uses the card reading apparatus to obtain a special prize or additional data for the game the player is currently playing.

In the above conventional case, however, the data stored on the data card is incorporated into the game machine connected to the card reading apparatus and the game machine is the one which uses the data. That is, the game machine reading the card is guaranteed use of the data read from the card. Therefore, the operation of reading data from a card is monotonous and tedious for a player. Up to now, there exist no entertaining games involving the operation of reading a card.

Therefore, a feature of an illustrative embodiment is to provide a game system and a storage medium having stored therein a game program, which realize a more engaging game by providing an entertaining way to read data stored on a card.

An illustrative embodiment has the following features to attain the object mentioned above. It is to be understood that reference numerals, etc., in parentheses are provided for the purpose of assisting in the understanding of the illustrative embodiments and showing the corresponding relationship with an embodiment, as will be described later, and thus are not intended to limit the scope of the illustrative embodiments.

One game system of the illustrative embodiments has a data reading apparatus (game machine 10a having card reader 40 installed thereon) and a plurality of game machines (10b to 10d) which are communicably connected to each other through a communication cable (50). The game system comprises master/slave setting means (CPU 21 which performs step S1; hereinafter only step numbers will be provided). The master/slave setting means sets, among the plurality of game machines, a game machine (10b) with authority to start communication as a master machine and sets the other game machines (10c and 10d) as slave machines (slave machines A and B). The plurality of game machines each comprise operation means (control switch 13), communication means (connector 14, communication I/F 24, and sending and receiving data buffers), and game processing means (S4, S12). The operation means inputs operation data in response to an operation by a player. The communication means sends and receives data to and from other game machines and the data reading apparatus through the communication cable. The game processing means processes a game in accordance with the operation data input from the operation means. The game machine set as the master machine comprises read data acquisition means (S2), game start instruction means (S3), determination means (S6), and data sending means (S7). Through the communication means, the read data acquisition means acquires data (card data CD) read into the data reading apparatus. The game start instruction means instructs (start information SI) the other game machines (10c and 10d) to start the game through the communication means. The determination means determines a game machine to which the read data acquired by the read data acquisition means is to be sent, based on processing results of the game processed by each game processing means (CPU 21 of game machine 10b which performs step S4 and CPUs 21 of game machines 10c and 10d which perform step S12). The data sending means sends the read data acquired by the read data acquisition means to the game machine determined by the determination means through the communication means.

The game machines set as the slave machines each may further comprise game processing result sending means (S13). The game processing result sending means sends a processing result (result data RDa and RDb) of the game processed by the game processing means to the game machine set as the master machine through the communication means. In this case, the game machine set as the master machine may further comprise result collection means (S5). The result collection means collects the processing results of the game having been sent from each game processing result sending means.

The data reading apparatus may include a card reader (40), for example. The card reader generates card data (CD) by mechanically reading a data storage region (46) of a card (45), the data storage region having stored therein data and being provided on a main surface of the card (card reading section 43; S32). In this case, the read data acquisition means may acquire the card data generated by the card reader as the read data. Typically, the data reading apparatus may be a game machine (10a) having the card reader installed thereon.

The read data acquisition means may transfer a read data sending program to the data reading apparatus (S21). In this case, the data reading apparatus may execute the read data sending program (S31) to send the read data to the game machine set as the master machine (S33).

A game program stored in a storage medium of an illustrative embodiment is executed by computers (CPUs 21) of a plurality of game machines. The game machines and a data reading apparatus are communicably connected to each other through a communication cable. The game program allows each computer to execute a master/slave setting step (S1) and a game processing step (S4, S12). The master/slave setting step sets, among the plurality of game machines, a game machine with authority to start communication as a master machine and sets the other game machines as slave machines. The game processing step processes a game in accordance with operation data in response to an operation by a player. If a game machine is set as the master machine at the master/slave setting step, the game program allows the computer of the game machine (CPU 21 of game machine 10b) to execute a read data acquisition step (S2), a game start instruction step (S3), a determination step (S6), and a data sending step (S7). Through the communication means, the read data acquisition step acquires data read into the data reading apparatus. The game start instruction step instructs the other game machines to start the game through the communication cable. The determination step determines a game machine to which the read data acquired at the read data acquisition step is to be sent, based on processing results of the game processed by the computers of the plurality of game machines (CPUs 21 of game machines 10b to 10d) at the game processing step. The data sending step sends the read data acquired at the read data acquisition step to the game machine determined at the determination step through the communication cable.

If a game machine is set as the slave machine at the master/slave setting step, the game program stored in the storage medium may further allow the computer of the game machine (CPUs 21 of game machines 10c and 10d) to execute a game processing result sending step (S13). The game processing result sending step sends a processing result of the game processed at the game processing step to the game machine set as the master machine through the communication cable. In this case, if a game machine is set as the master machine at the master/slave setting step, the game program stored in the storage medium may further allow the computer of the game machine to execute a result collection step (S5). The result collection step collects the processing results of the game having been sent from the game machines set as the slave machines.

For example, the data read into the data reading apparatus may be card data generated by mechanically reading a data storage region of a card, the data storage region having stored therein data and provided on a main surface of the card. In this case, the read data acquisition step may acquire the card data as the read data.

The read data acquisition step may include a step of transferring a read data sending program for sending the read data to the data reading apparatus (S21). In this case, the read data acquisition step may acquire the read data through the communication cable (S22), by executing the read data sending program to send the read data to the game machine set as the master machine (S33).

According to a game system of the illustrative embodiments, since the data read into the data reading apparatus is sent to a specific game machine(s) among a plurality of game machines communicably connected to each other, based on game results, an amusing game can be provided which uses the read data to be sent as special prize data, which is given only to a specific player(s). Accordingly, all players who operate the game machines connected to the game system can enjoy an amusing game.

Further, in the case where the slave machines include game processing result sending means, and the master machine includes result collection means, a game machine acting as the master machine can receive game processing results from other game machines connected thereto, comprehensively determine the rankings of game processing results of the master and slave machines, and thus the game machine acting as the master machine can send read data to a specific game machine(s) based on the rankings.

In the case where the read data is card data generated by mechanically reading a data storage region of a card which has data stored therein and which data is provided on a main surface of the card, nobody knows which game machine will acquire the card data from the operation of reading the card by a card reader machine, and thus the operation of reading the card itself provides a fun experience. In addition, card data stored on a card, which is conventionally intended to simply be read, can be used as special prize data for which the game is played. Further, in the case where the data reading apparatus is a game machine having a card reader installed thereon, the data reading apparatus can be implemented by only installing a card reader on one of game machines in the game system, and thus it is possible to reduce the cost of providing a special data reading apparatus.

In the case where the master machine transfers, to the data reading apparatus, a read data sending program for sending read data to the master machine, a game machine in the game system can add a read data sending function to the data reading apparatus according to the game system, and thus it is possible to reduce the cost of providing a special data reading apparatus which is provided with a read data sending function.

The illustrative embodiments can also be realized as a storage medium having stored therein a game program to be executed by computers of game machines in the aforementioned game system, in which case also the same advantageous effects as those described above can be provided. In addition, since in the storage medium having stored therein the game program all game machines play a game to compete for data read from the data reading apparatus, it is not necessary to provide the storage medium, having stored therein the game program, individually to the master and slave machines. That is, merely by connecting a plurality of game machines and a data reading apparatus to each other, read data is sent to a specific game machine(s) based on game processing results of all the game machines, and thus the read data is used as special prize data given only to a specific player(s). Accordingly, a storage medium having stored therein a game program which realizes a more amusing game can be provided.

These and other objects, features, aspects and advantages of the illustrative embodiments will become more apparent from the following detailed description of the illustrative embodiments when taken in conjunction with the accompanying drawings.

BRIEF DESCRIPTION OF THE DRAWINGS

FIG. 4 is a block diagram showing the game machine 10, the cartridge 30, and the card reader 40 of FIG. 1;

DESCRIPTION OF THE PREFERRED EMBODIMENTS

Figure 1:
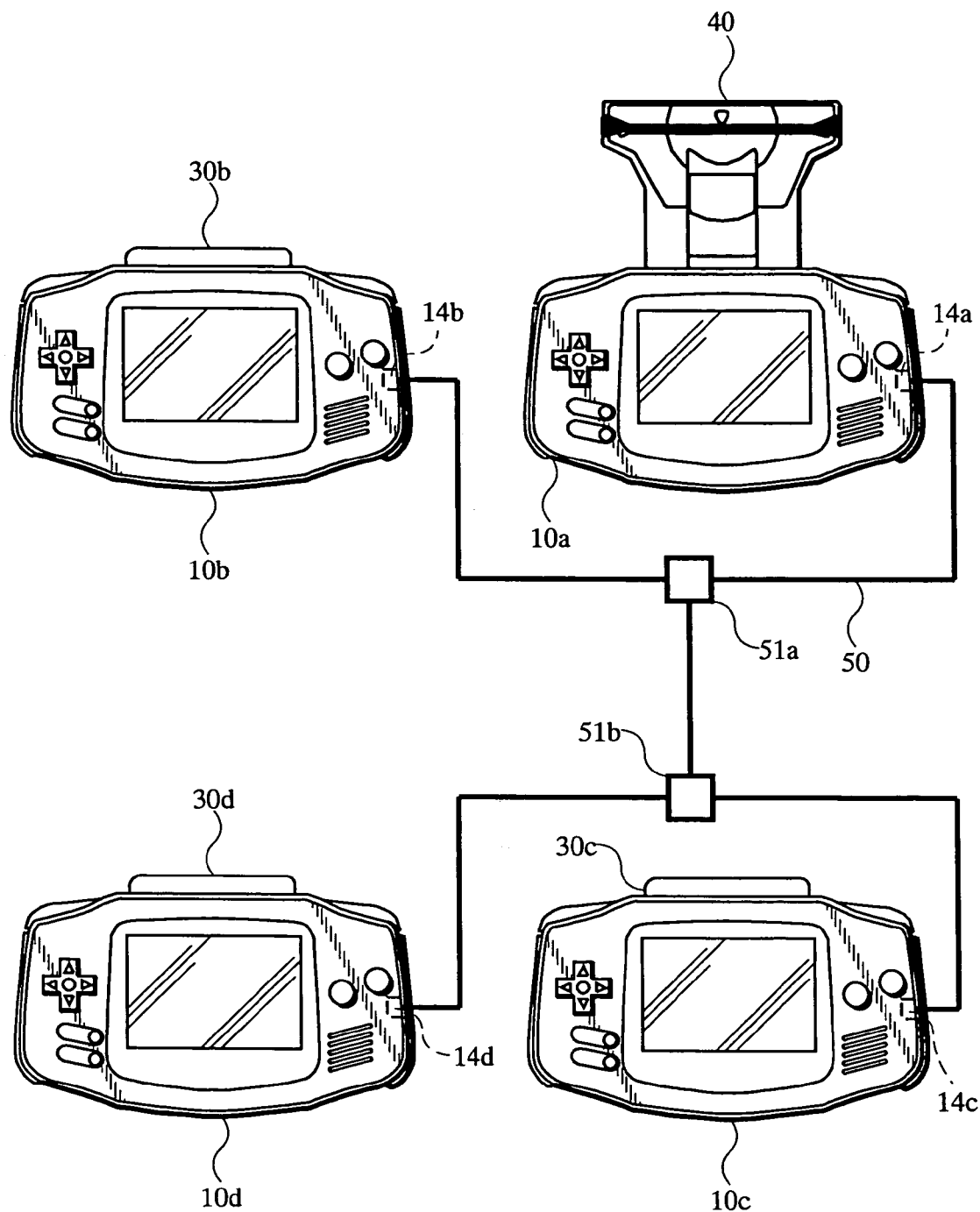
FIG. 1 is an overall schematic diagram showing a configuration of a game system according to an embodiment of the illustrative embodiments.

Referring to FIG. 1, a game system according to an embodiment of the illustrative embodiments will be described. FIG. 1 is an overall schematic diagram showing a configuration of the game system.

In FIG. 1, the game system includes four game machines 10a to 10d and a communication cable 50. The game machines 10a to 10d are connected to each other through the communication cable 50. Although the game machines 10a to 10d are portable game machines, the illustrative embodiments are not limited thereto and can also be applied to non-portable game machines. The game machine 10a has a card reader 40 connected thereto via a connector (not shown) to read the data section of a data card (described later) and the communication cable 50 connected thereto via a connector 14a. The game machines 10b to 10d have game cartridges (hereinafter simply referred to as the "cartridges" which will be described later) 30b to 30d connected thereto respectively via their respective connectors (not shown) and the communication cable 50 connected thereto via connectors 14b to 14d, respectively. The communication cable 50 may have connectors (connectors 51a and 51b in FIG. 1) provided in the middle thereof to branch and relay data output from each of the game machines 10a to 10d.

For simplification purposes, in describing the flow of communication data, the connectors provided in the middle of the communication cable 50 are omitted. In addition, since the four game machines 10a to 10d are of the same configuration and the three cartridges 30b to 30d are of the same configuration, in the following description the game machines, the connectors, and the cartridges are collectively referred to with reference numerals as the "game machine 10", "connector 14", "cartridge 30", respectively, unless the game machines, the components of the game machines, or the cartridges need to be distinguished from each other. In one illustrative embodiment, the game machine 10a having the card reader 40 connected thereto may be referred to as the "card reader machine". Further, since the game machine 10b has authority to start communication, the game machine 10b may be referred to as a master machine and the game machines 10c and 10d may be referred to as slave machines A and B, respectively where necessary.

Figure 2:
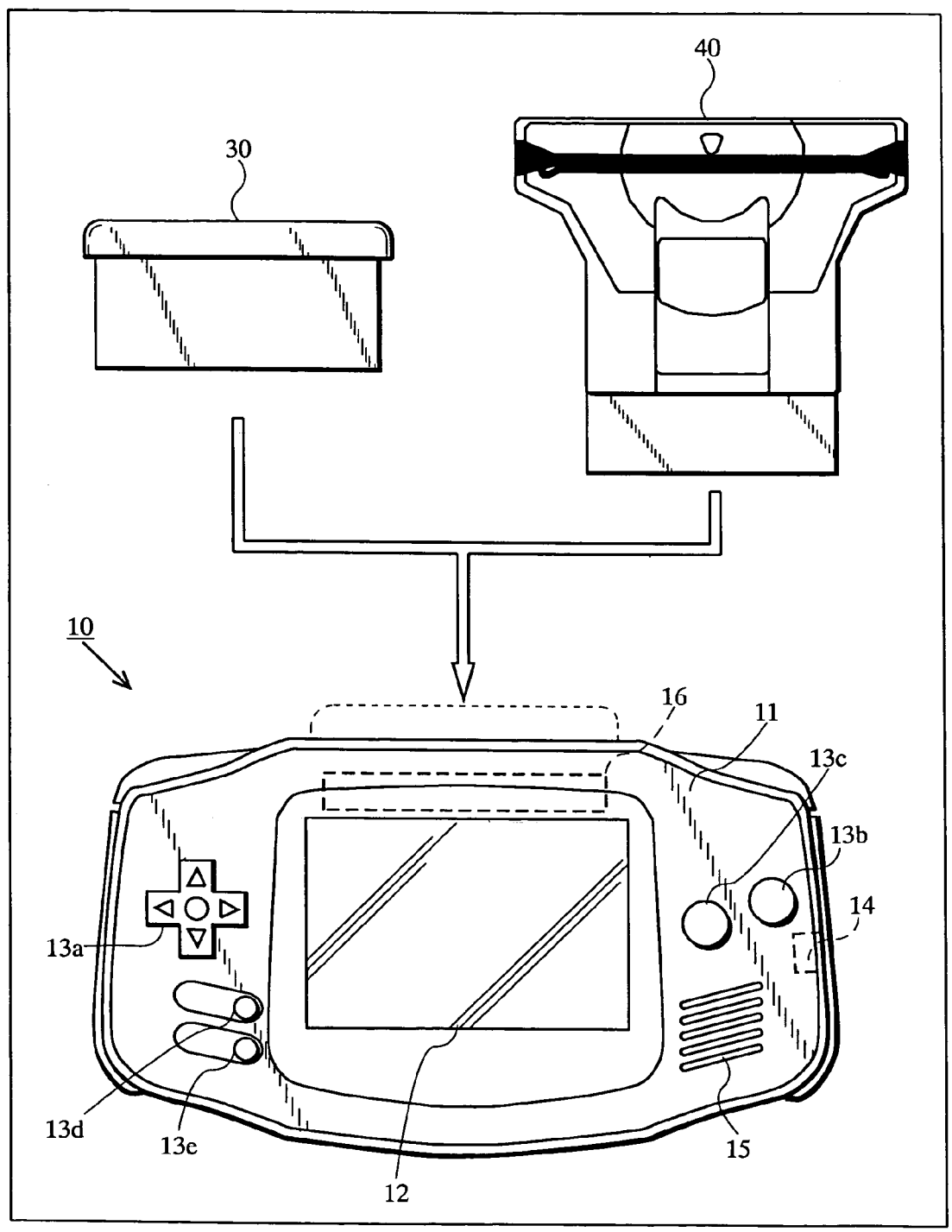
FIG. 2 is an external view of a game machine 10, a cartridge 30, and a card reader 40 of FIG. 1.

Referring now to FIG. 2, the structure of the game machine 10 will be described. FIG. 2 is an external view of the game machine 10, the cartridge 30, and the card reader 40.

In FIG. 2, the cartridge 30 which acts as an information storage medium, for a game program and the like, is installed in the game machine 10 in the direction indicated by the arrow in the drawing, whereby a semiconductor memory and the like (a program ROM 31 and a backup RAM 32 shown in FIG. 4), contained in the cartridge 30 and the game machine 10, are electrically connected to each other. The game machine 10 has a cartridge insertion opening (not shown), provided on the top backside thereof, to install or uninstall the cartridge 30 at will. A connector 16 (a dashed-line region in the drawing) is provided near the bottom surface of the insertion opening to establish an electrical connection with the cartridge 30. Further, a connector 14 (a dashed-line region in the drawing) is provided at a side surface of the game machine 10 to connect to a communication cable 50 which allows the game machine 10 to communicate with other game machines.

Alternatively, the card reader 40 may be installed on the game machine 10 in the direction indicated by the arrow in the drawing, as in the case with the cartridge 30, whereby a semiconductor memory, a card reading section, and the like (a backup RAM 41, a program ROM 42, and a card reading section 43 shown in FIG. 4), contained in the card reader 40 and the game machine 10, are electrically connected to each other. In the case where the card reader 40 is connected to the game machine 10 also, the card reader 40 is installed on or uninstalled from the cartridge insertion opening at will and is electrically connected to the game machine 10 via the connector 16. That is, either the cartridge 30 or the card reader 40 can be installed on the game machine 10 through the cartridge insertion opening.

The game machine 10 has a housing 11. A liquid crystal display (LCD) 12 is provided in the central region of the main surface (the surface shown in the drawing) of the housing 11. A speaker 15 and control switches 13a to 13e are provided in free outer regions across the LCD 12. Although the operation instructions for the control switches 13a to 13e are different depending on the content of a game program to be processed in the game machine 10, typically the control switch (cross key) 13a gives an instruction regarding a moving direction, the control switches 13b and 13c give instructions regarding operations such as "A" and "B", and the control switches 13d and 13e give instructions regarding operations such as "START" and "SELECT".

Figure 3:
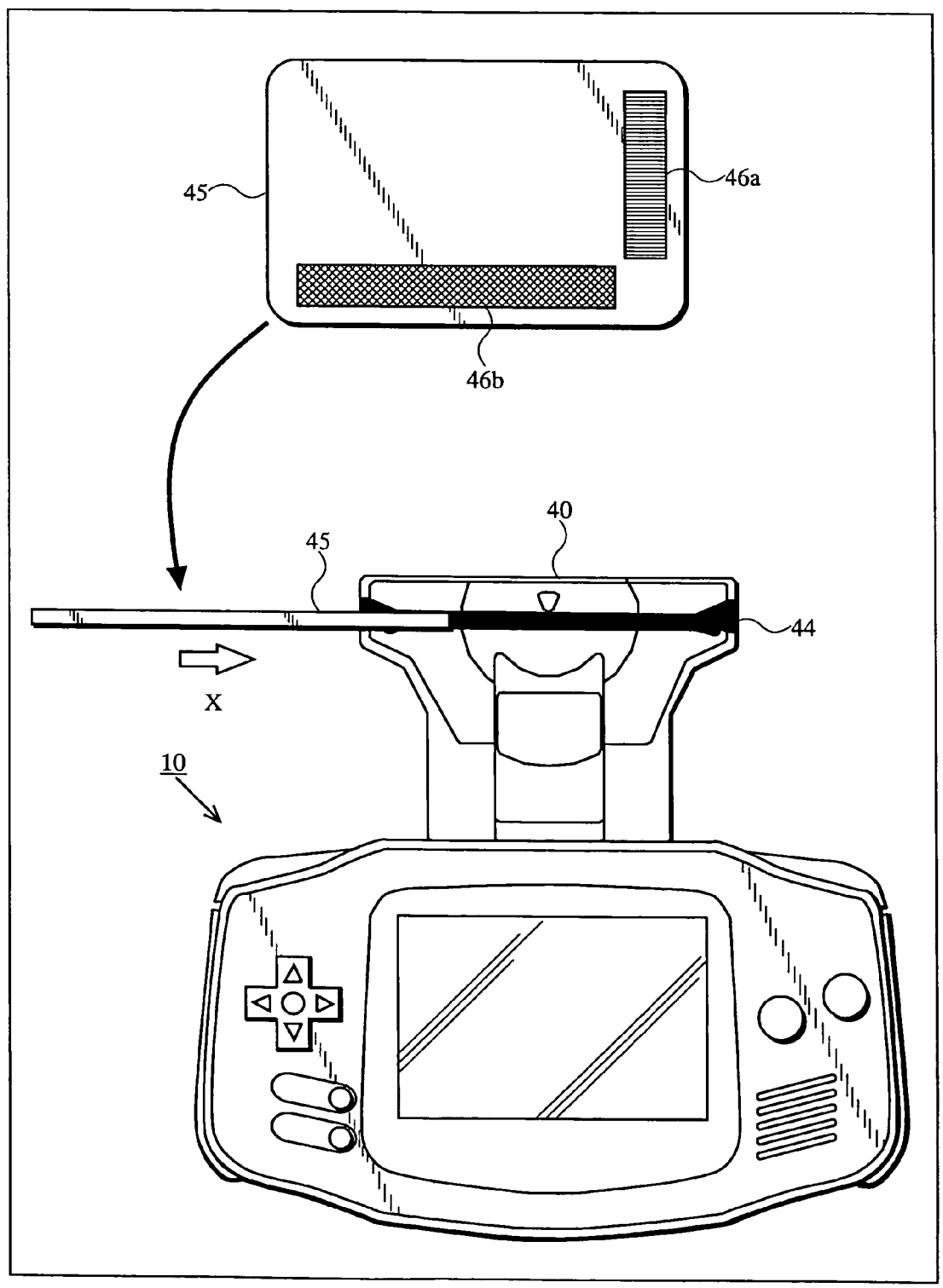
FIG. 3 is an external view for describing the operation of reading data from a data card in the game machine 10 having the card reader 40 of FIG. 1 installed thereon.

Referring to FIG. 3, the operation of reading data from a data card will be described. FIG. 3 is an external view for describing the operation of reading data from a data card in the game machine 10 having the card reader 40 installed thereon.

In FIG. 3, a data card (hereinafter simply referred to as the "card") 45 has a data storage region 46 provided on the main surface thereof. The data storage region 46 is provided on the card 45 along at least one side. In FIG. 3, data storage regions 46a and 46b are provided on the card 45 along the right side and the bottom side of the front face, respectively.

Note that in a free region other than the data storage region 46 on the main surface of the card 45 there may be provided a unique design of the card, however, such a design is omitted in the drawing.

In the data storage region 46, data is stored so as to be optically, electrically, or magnetically readable. The longitudinal direction of the data storage region 46 is the scan direction in which the stored data is read. For example, an optical storage method is as follows. With a block of a predetermined area being a unit, a plurality of blocks are collected in a scan direction to form a storage region. Then, dots are distributed over a two-dimensional array of blocks and the dots are printed on a predetermined region of a card so as to be distributed randomly, whereby data is stored. This storage method is hereinafter referred to as the "two-dimensional bar code storage method" and the printed data is here in after referred to as the "two-dimensional bar code". For electric and magnetic storage methods, an IC card and a magnetic stripe are formed in the same manner as described above, respectively.

The card reader 40 has a grooved guide section 44 (a blackened region in the drawing) with its opening direction oriented in the same direction as the front face of the game machine when the card reader 40 is installed on the game machine 10 (i.e., an upward direction perpendicular to the drawing). Data is read from the card 45 by sliding the card 45 in the X direction shown in the drawing, with the side of the data storage region 46 to be read abutting against the bottom surface of the guide section 44. In addition, to read data stored in the data storage region 46, the card reader 40 has a card reading section 43 (not shown), such as an optical reader, incorporated therein at a location opposite of the data storage region 46 of the card 45 to be inserted into the guide section 44. The card reading section 43 reads the data storage region 46 provided on the card 45 which is slid along the guide section 44.

Referring now to FIG. 4, the internal configurations of the game machine 10, the cartridge 30, and the card reader 40 will be described. FIG. 4 is a block diagram showing the game machine 10, the cartridge 30, and the card reader 40.

In FIG. 4, the game machine 10 has a central processing unit (CPU) 21, an LCD driver 22, a sound generation circuit 23, a communication interface (I/F) 24, a display RAM 25, and a working RAM (work RAM) 26, in addition to the aforementioned external components. The cartridge 30 has a program ROM 31 and a backup RAM 32. The card reader 40 has a backup RAM 41, a program ROM 42, and a card reading section 43.

In the program ROM 31, there are stored a game program, in which the content of a game played in the game machine 10 is described, images and sound data of the game program, and a program for sending card data. Based on the game program, the CPU 21 operates in a game processing mode. The control switch 13 is connected to the CPU 21. The control switch 13 is connected to the CPU 21 and outputs data input in response to an operation by a player, to the CPU 21. In addition, the CPU 21 is communicably connected to CPUs of other game machines through the communication I/F 24, the connector 14, and the communication cable 50.

The CPU 21 executes a boot program which is stored in a boot ROM (not shown) and operates in a game processing mode based on the game program stored in the program ROM 31. When the cartridge 30 is installed in the game machine 10, the CPU 21 accesses the program ROM 31 via the connector 16 (see FIG. 2). In addition, the CPU 21 performs game processing based on an operation signal input by the control switch 13 and the game program, stores data being processed in the work RAM 26, and temporarily stores image data in the display RAM 25.

When the CPU 21 operates in a game processing mode, the game program, processing data, and the like are stored in the work RAM 26. In this manner, the work RAM 26 is appropriately used as a storage region necessary for processes performed by the CPU 21.

The sound generation circuit 23 has a D/A conversion circuit and an amplification circuit. The sound generation circuit 23 converts sound data, which is based on the processing results of the game program performed by the CPU 21, into a sound signal (analog signal), appropriately amplifies the sound signal, and then allows the speaker 15 to output the amplified sound signal as sound effects, etc.

In the display RAM 25, image data processed by the CPU 21 is temporarily stored. The CPU 21 and the LCD 12 are connected to the LCD driver 22. The LCD driver 22 performs display control, for displaying the image data stored in the display RAM 25 on the LCD 12, in accordance with an instruction from the CPU 21, and displays the image on the LCD 12.

In the program ROM 31 of the cartridge 30, there are permanently stored a game program, various data used in the game program, and a program for sending card data. In the backup RAM 32, game data obtained by executing the game program is stored rewritably and nonvolatilely. For example, game data to be stored in the backup RAM 32 includes backup data indicating the progress at the time when the game is finished. The backup RAM 32 may be composed of a flash memory or the like.

The program ROM 42 of the card reader 40 has permanently stored therein a program for reading card data stored in the data storage region 46. In the backup RAM 41, data such as read card data obtained by executing the program is stored rewritably and nonvolatilely. The backup RAM 41 may also be composed of a flash memory or the like.

The card reading section 43 mechanically reads card data stored in the data storage region 46 of the card 45 and appropriately processes the read data, whereby the data is converted in a data format which is processable by the CPU 21. For example, in the case where the data storage region 46 uses a two-dimensional bar code, an optical reader is used; in the case where an IC card is used, an IC card reader is used; and in the case where a magnetic stripe is used, a magnetic reader is used.

Figure 5:
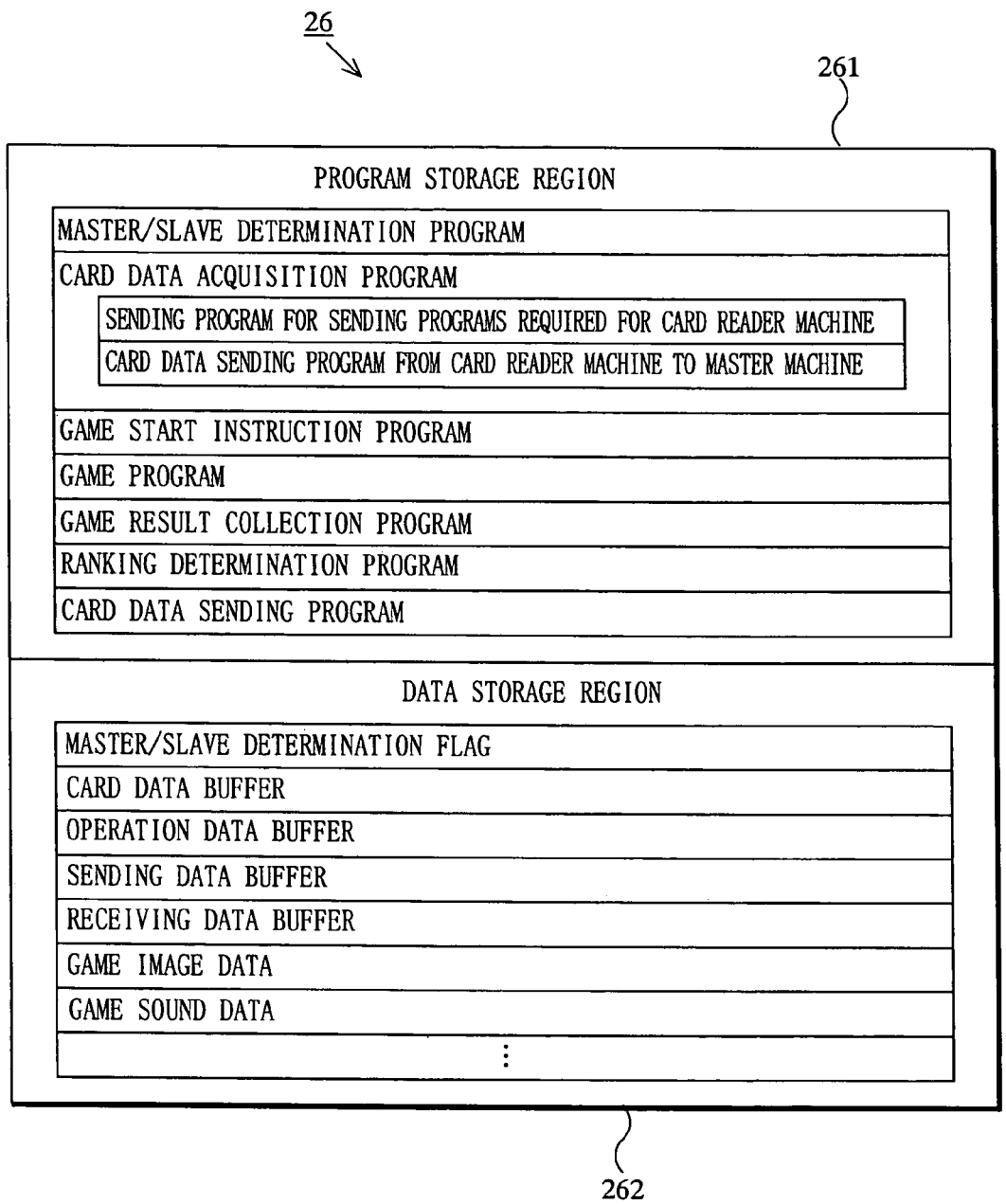
FIG. 5 is a diagram for describing programs and data stored in a work RAM 26 of FIG. 4.

Referring to FIG. 5, programs and data to be stored in the work RAM 26 of the game machines 10b to 10d (i.e., the game machines 10 other than the card reader machine) will be described. FIG. 5 is a diagram for describing programs and data stored in the work RAM 26.

In FIG. 5, the work RAM 26 has a program storage region 261 and a data storage region 262. In the program storage region 261, a master/slave determination program, a card data acquisition program, a game start instruction program, a game program, a game result collection program, a ranking determination program, and a card data sending program are stored from the program ROM 31. The card data acquisition program includes a sending program, for sending programs required for the card reader machine, and a card data sending program from the card reader machine to the master machine. The data storage region 262 has stored therein a master/slave determination flag, a card data buffer, an operation data buffer, a sending data buffer, a receiving data buffer, game image data, and game sound data.

Figure 6:
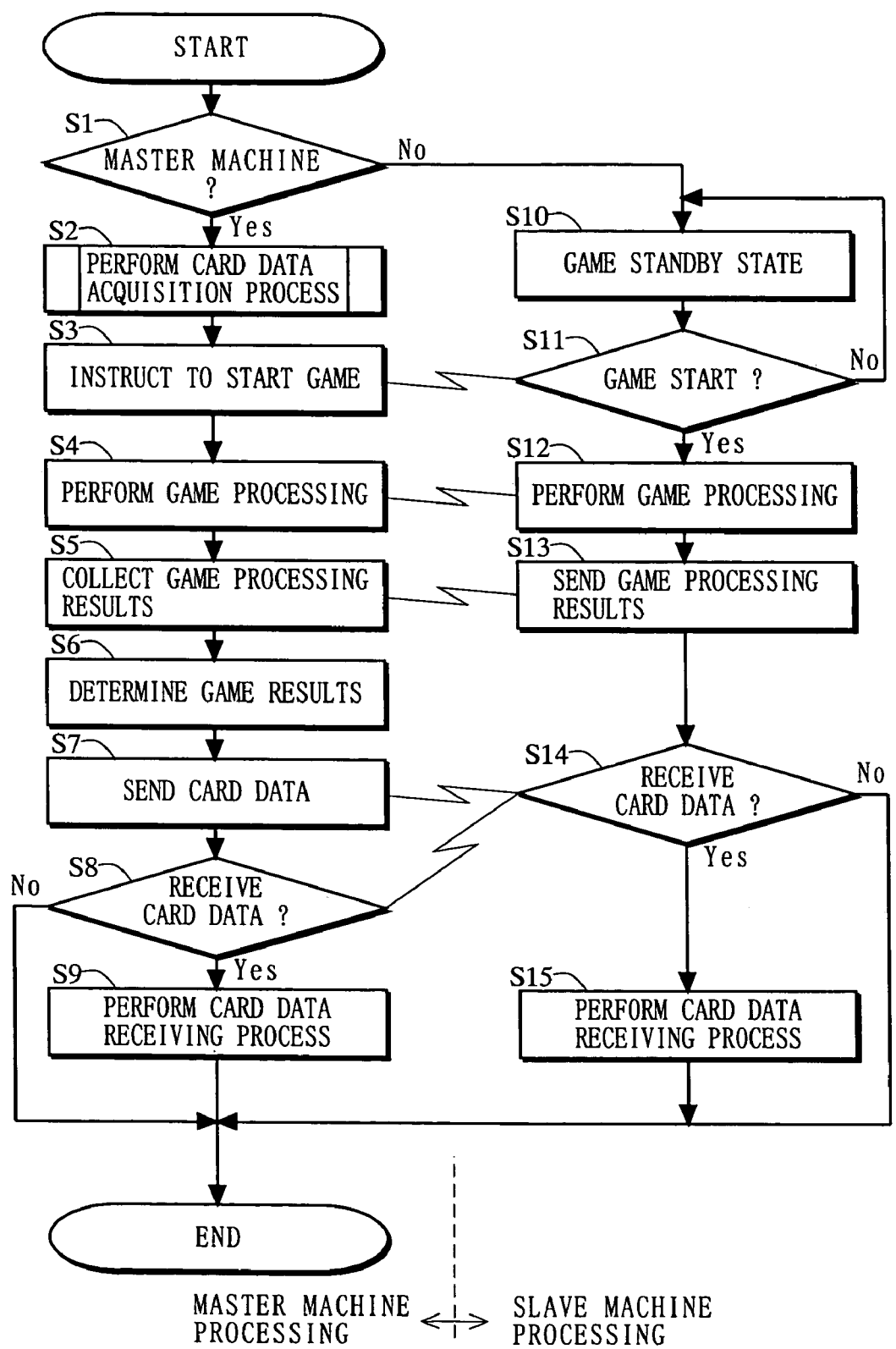
FIG. 6 is a flowchart showing the entire game processing performed by each of master and slave game machines 10.

The master/slave determination program sets one master machine (e.g., the game machine 10b) from the game machines 10b to 10d, other than the card reader machine, and sets slave machines (e.g., the game machines 10c and 10d) other than the master machine (S1 in FIG. 6). For example, the master/slave determination program sets, as the host machine, a game machine which is the first machine among game machines to have been connected to the communication cable 50 or to have been turned on, and sets other game machines as slave machines.

The card data acquisition program is used to send card data CD, having been read by the card reader machine, to the master machine from the card reader machine (S 2 in FIG. 6). The sending program, for sending programs required for the card reader machine, which is included in the card data acquisition program, defines a process of sending programs required for the card reader machine to the card reader machine from the master machine. The card data sending program, from the card reader machine to the master machine, defines a process of sending the card data CD read by the card reading section 43 to the master machine from the card reader machine (S33 in FIG. 7). In addition, the card data sending program, from the card reader machine to the master machine, is transferred to the card reader machine from the master machine, by executing the sending program for sending programs required for the card reader machine (S21 in FIG. 7).

The game start instruction program defines a process of sending and receiving start information SI, used to instruct the slave machines by the master machine, to start a predetermined game to be played between the master machine and the slave machines (S3 and S11 in FIG. 6). The game program defines a process of performing the predetermined game by the master machine and the slave machines (S4 and S12 in FIG. 6). For example, the game program defines a game in which the master machine and the slave machines compete for the number of times they can input the control switch 13 or for the input timing of the control switch 13. The game result collection program defines a process of sending results of the game processing of the slave machines to the master machine from the slave machines and collecting the game results (S5 and S13 in FIG. 6) by the master machine. The ranking determination program defines a process of comparing between the collected game results of the slave machines and a game result of the master machine and determining their respective rankings (S6 in FIG. 6). The card data sending program defines a process of sending the card data CD to a specific game machine(s), based on the results determined by executing the ranking determination program (S7 in FIG. 6).

The master/slave flag is assigned to each of the game machines 10b to 10d based on the settings of the master/slave determination program. By means of the master/slave flags, the master machine and the slave machines are distinguished. In the card data buffer, the card data CD, having been sent to the master machine from the card reader machine, or the card data CD, having been sent to the specific game machine(s) based on the game results, is stored.

In the operation data buffer, operation data in response to the input of the control switch 13 is appropriately stored. The CPU 21 can acquire operation data, resulting from the operation of the control switch 13 by a player, by reading the data stored in the operation data buffer. In the case where a game machine sends operation data, result data, etc., to other game machines, such data is temporarily stored in the sending data buffer. The data temporarily stored in the sending data buffer is sent to all the game machines 10a to 10d connected to the communication cable 50 at a predetermined timing. The sent data is then stored in the receiving data buffer at a predetermined timing. The receiving data buffer is a FIFO buffer (First-In First-Out buffer). The receiving data buffer can store a plurality of data in the order of storage and can sequentially read the plurality of data in the order of storage. The operation data stored in the receiving data buffer is then sequentially transferred to the operation data buffer at a predetermined timing.

Game image data is image data, such as characters and backgrounds, to be displayed on the LCD 12 during game processing. Game sound data is sound data, such as sound effects and music, to be reproduced during game processing.

Figure 7:
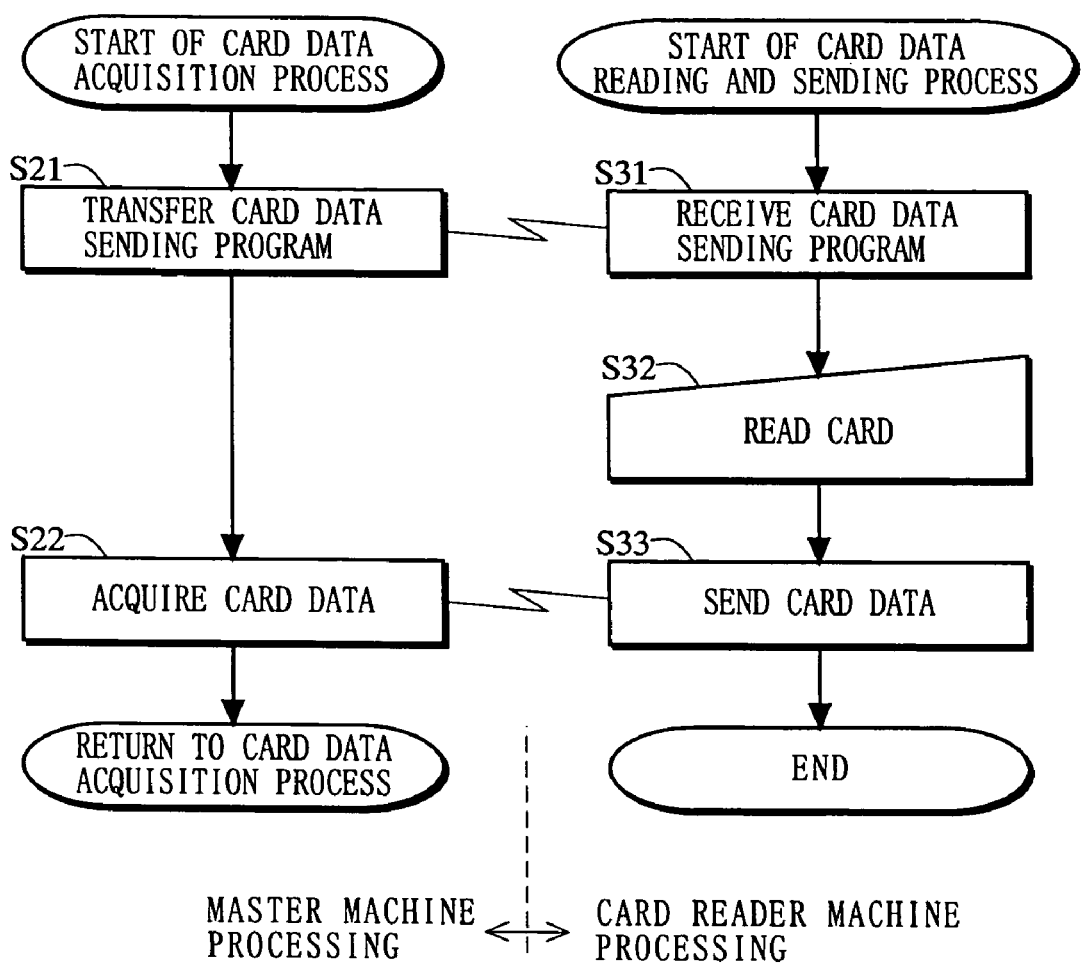
FIG. 7 is a subroutine showing the detailed operation of step S2 of FIG. 6.

Referring now to FIGS. 6 to 12, game processing to be executed by the game system will be described. FIG. 6 is a flowchart showing the entire game processing performed by each of the master and slave game machines 10. FIG. 7 is a subroutine showing the detailed operation of step S2 of FIG. 6. FIGS. 8 to 12 are schematic diagrams for describing the flow of data to be sent and received between the game machines 10, which are provided to specifically describe the operation of the game processing.

When each of the game machines 10a to 10d described in FIG. 1 is turned on, the CPU 21 of each game machine 10 executes a boot program stored in a boot ROM (not shown), there by initializing each unit such as the work RAM 26. In the game machines 10b to 10d, programs stored in the program ROM 31 are read into the respective work RAMs 26. Then, by executing the master/slave determination program, each of the game machines 10b to 10d is set to act as a master or slave machine, based on a predetermined condition, and the master/slave determination flags of the respective game machines 10b to 10d are set, based on the setting results of the master/slave determination program. Here, for the purpose of providing a specific description, the game machine 10a is set to act as a card reader machine, the game machine 10b is set to act as a master machine, the game machine 10c is set to act as a slave machine A, and the game machine 10d is set to act as a slave machine B.

In FIG. 6, the CPU 21 of each of the game machines 10b to 10d, other than the card reader machine, determines whether its own machine is a master machine (step S1). If it is determined to be a master machine, processing proceeds to step S2, and if it is determined to be a slave machine, processing proceeds to step S10. In the flowchart shown in FIG. 6, the flow (steps S2 to S9) on the left side shows the processing of the master machine, and the flow (steps S10 to S15) on the right side shows the processing of the slave machines. The two flows are processed simultaneously.

At step S2, the CPU 21 of the master machine performs the process of acquiring card data. Referring to FIG. 7, the process of acquiring card data will be described below. FIG. 7 is a subroutine showing the detailed operation of step S2. The flow (steps S21 and S22) on the left side shows the processing of the master machine, and the flow (steps S31 to S33) on the right side shows the processing of the card reader machine.

In FIG. 7, the CPU 21 of the master machine transfers the card data sending program through the communication cable 50 to the card reader machine (step S21). The card data sending program, having been transferred at step S21, is received by the card reader machine and stored in a work RAM 26 of the card reader machine (step S31).

Subsequently, the card reader machine performs the operation of reading card data CD, stored in a data storage region 46 of a card 45, using a card reader 40 installed on the card reader machine (step S32). A card reading section 43 mechanically reads the data storage region 46 and appropriately processes the card data CD, whereby the card data CD is converted into a data format which is processable by the CPU 21. Note that the operation of reading the card data CD is the same as that described above, and thus the detailed description thereof will be omitted. The CPU 21 of the card reader machine then sends the read card data CD to the master machine, based on the card data sending program having been received at step S31 (step S33).

Figure 8:
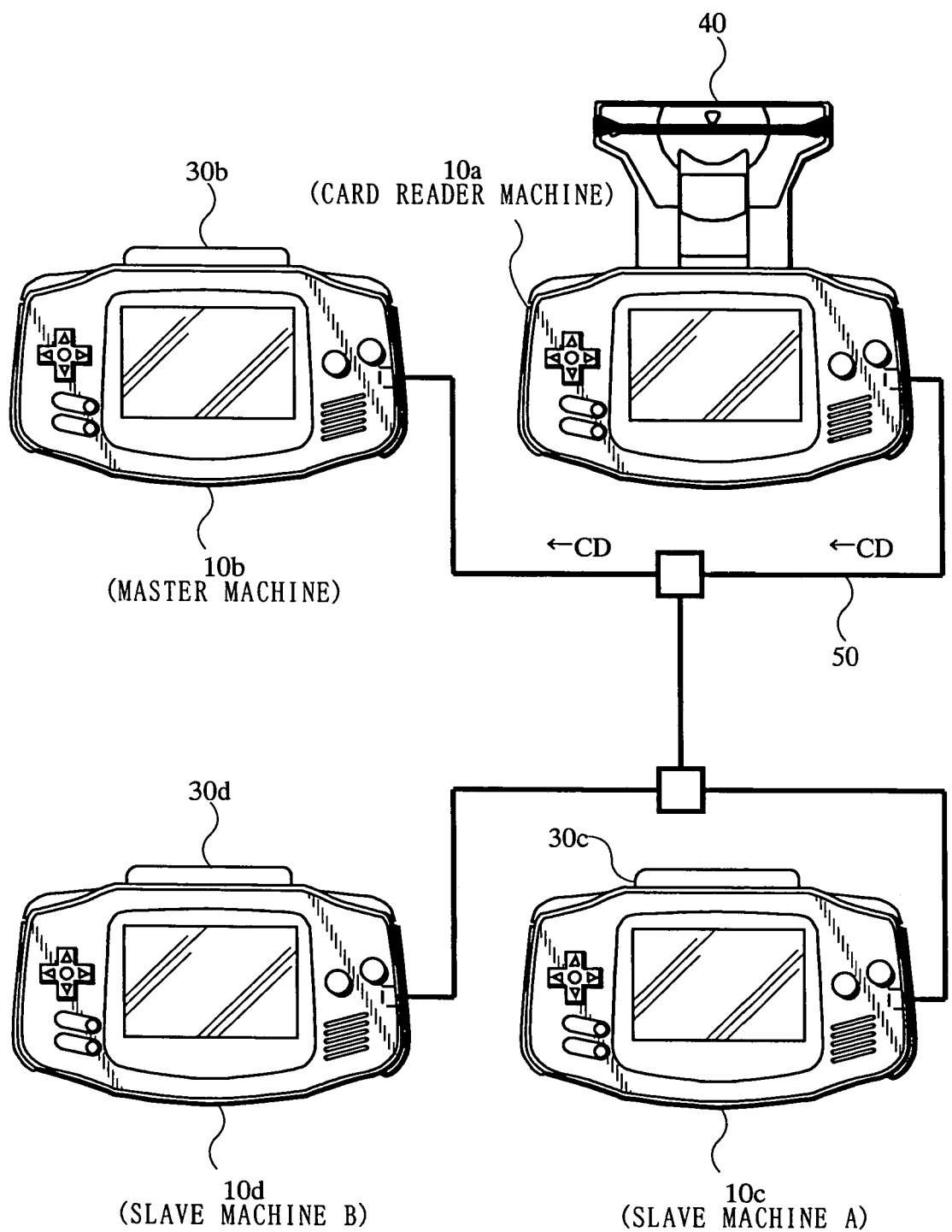
FIG. 8 is a diagram showing a state where card data CD is sent to a game machine 10b (master machine) from a game machine 10a (card reader machine)

Then, the CPU 21 of the master machine stores the card data CD, having been sent from the card reader machine in the card data buffer of its own machine (step S22), and completes the process of acquiring card data shown in the subroutine. FIG. 8 shows a state where the card data CD is sent to the game machine 10b (master machine) from the game machine 10a (card reader machine).

Figure 9:
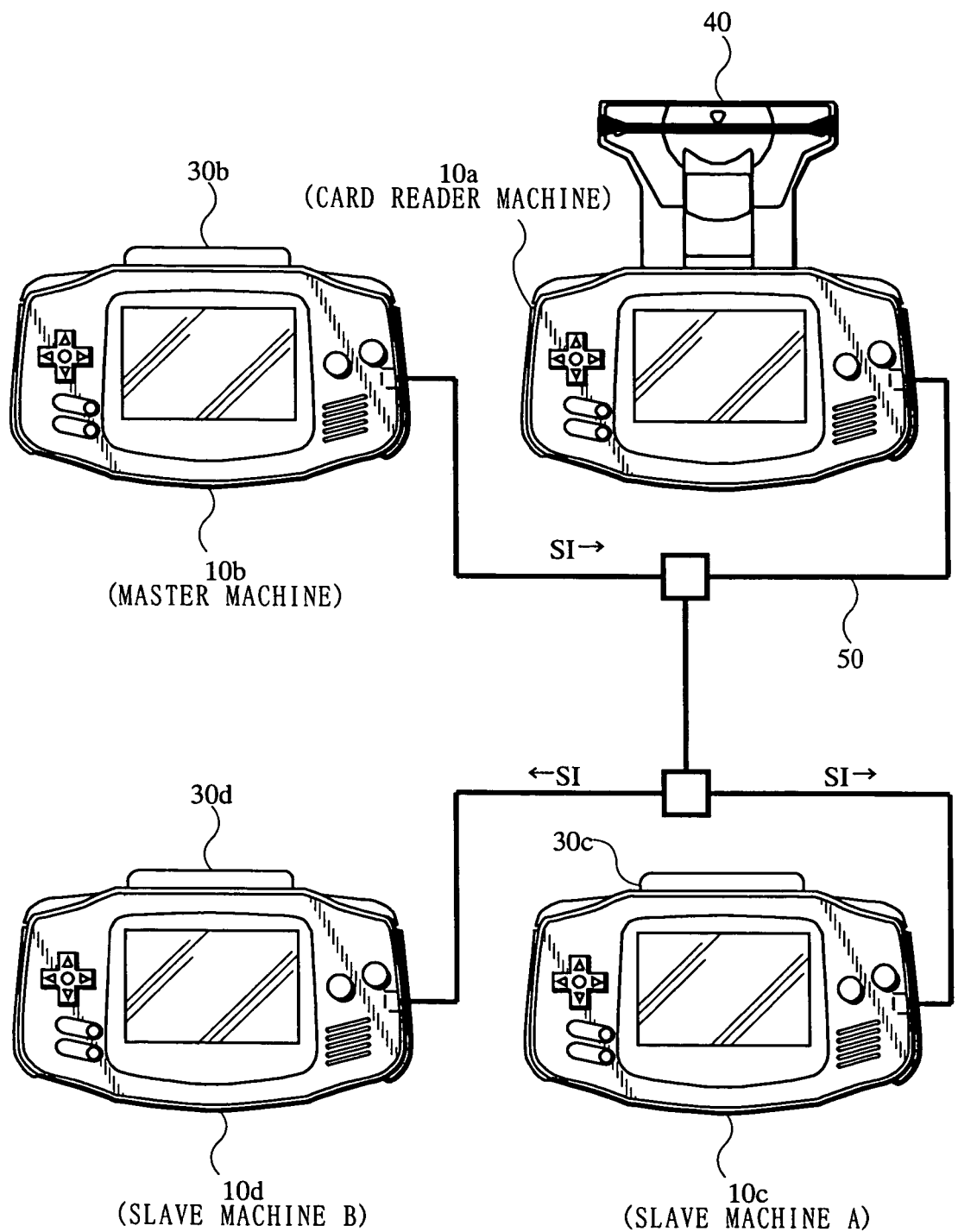
FIG. 9 is a diagram showing a state where start information SI is sent to a game machine 10c (slave machine A) and a game machine 10d (slave machine B) from the game machine 10b (master machine)

Referring back to FIG. 6, after the process of acquiring card data at step S2, the CPU 21 of the master machine instructs the slave machines to start a game (step S3), whereby game processing starts (step S4). Specifically, the CPU 21 of the master machine sends, through the communication cable 50, start information SI, instructing a game start, to the slave machines, thereby instructing the slave machines to start the game. FIG. 9 shows a state where the start information SI is sent to the game machine 10c (slave machine A) and the game machine 10d (slave machine B) from the game machine 10b (master machine).

Meanwhile, the CPU 21 of each of the slave machines A and B is in a game standby state (step S10) and waits for an instruction by the master machine to start the game (step S11). The CPUs 21 of the slave machines A and B maintain the game standby state at step S10 until receiving an instruction to start the game from the master machine. When the slave machines A and B receive the start information SI from the master machine, the CPUs 21 of the slave machines A and B start game processing (step S12).

Figure 10:
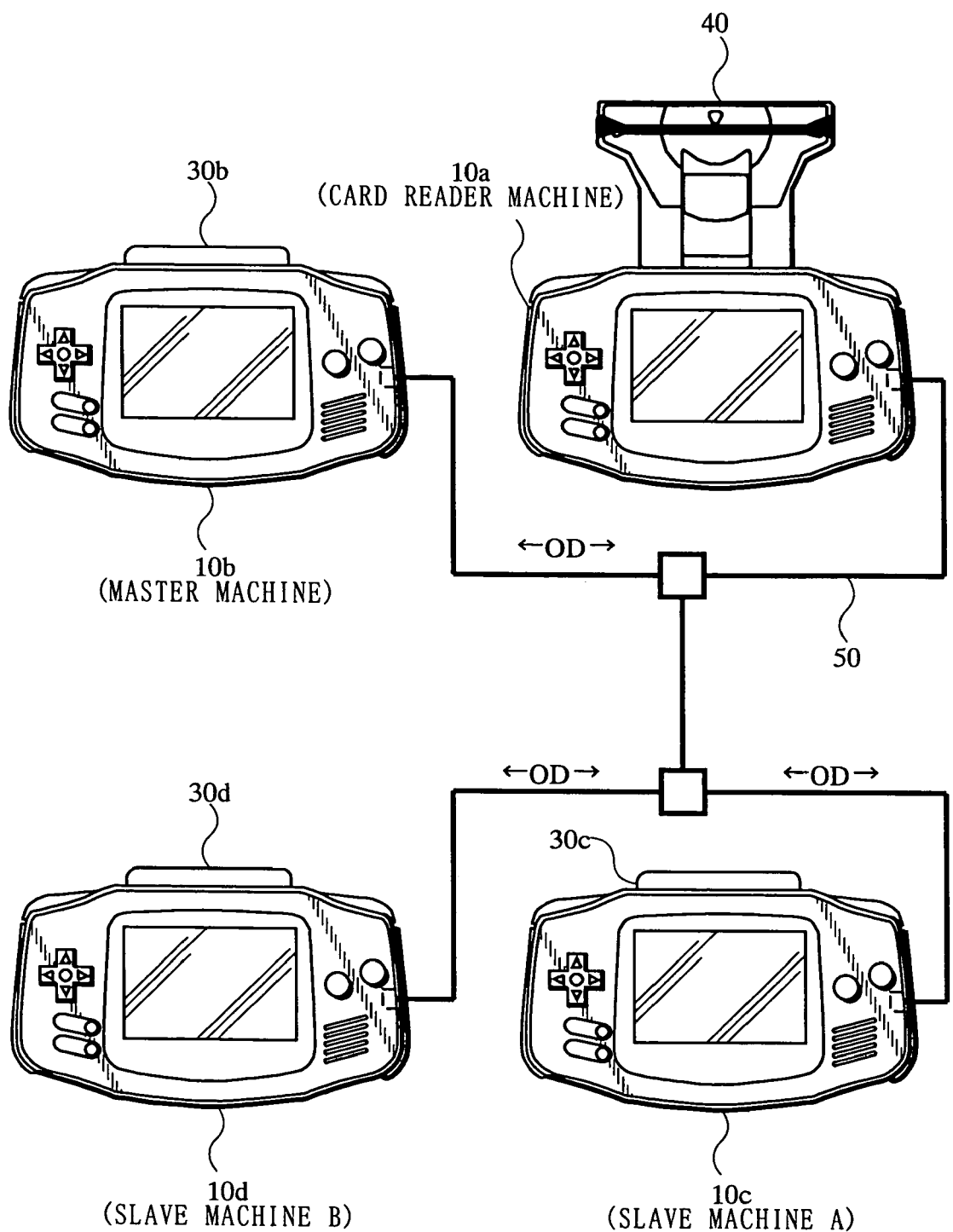
FIG. 10 is a diagram showing a state where the game machine 10b (master machine), the game machine 10c (slave machine A), and the game machine 10d (slave machine B) send and receive operation data OD from each other while competing in a game.

In the game processing at steps S4 and S12, the master machine and the slave machines may send and receive their respective operation data to and from each other and compete against each other in a game, or a game may be executed in which the master and slave game machines individually process their respective operation data. Although in the present embodiment, a game is executed in which the master machine and the slave machines compete for the number of times they can input the control switch 13 or for the input timing of the control switch 13, for example, any game can be executed as long as the game involves comparing game results of the respective game machines and thereby determining the rankings of the respective game machines. FIG. 10 shows, as exemplary game processing, a state where the game machine 10b (master machine), the game machine 10c (slave machine A), and the game machine 10d (slave machine B) send and receive their respective operation data OD to and from each other and compete against each other in a game.

Figure 11:
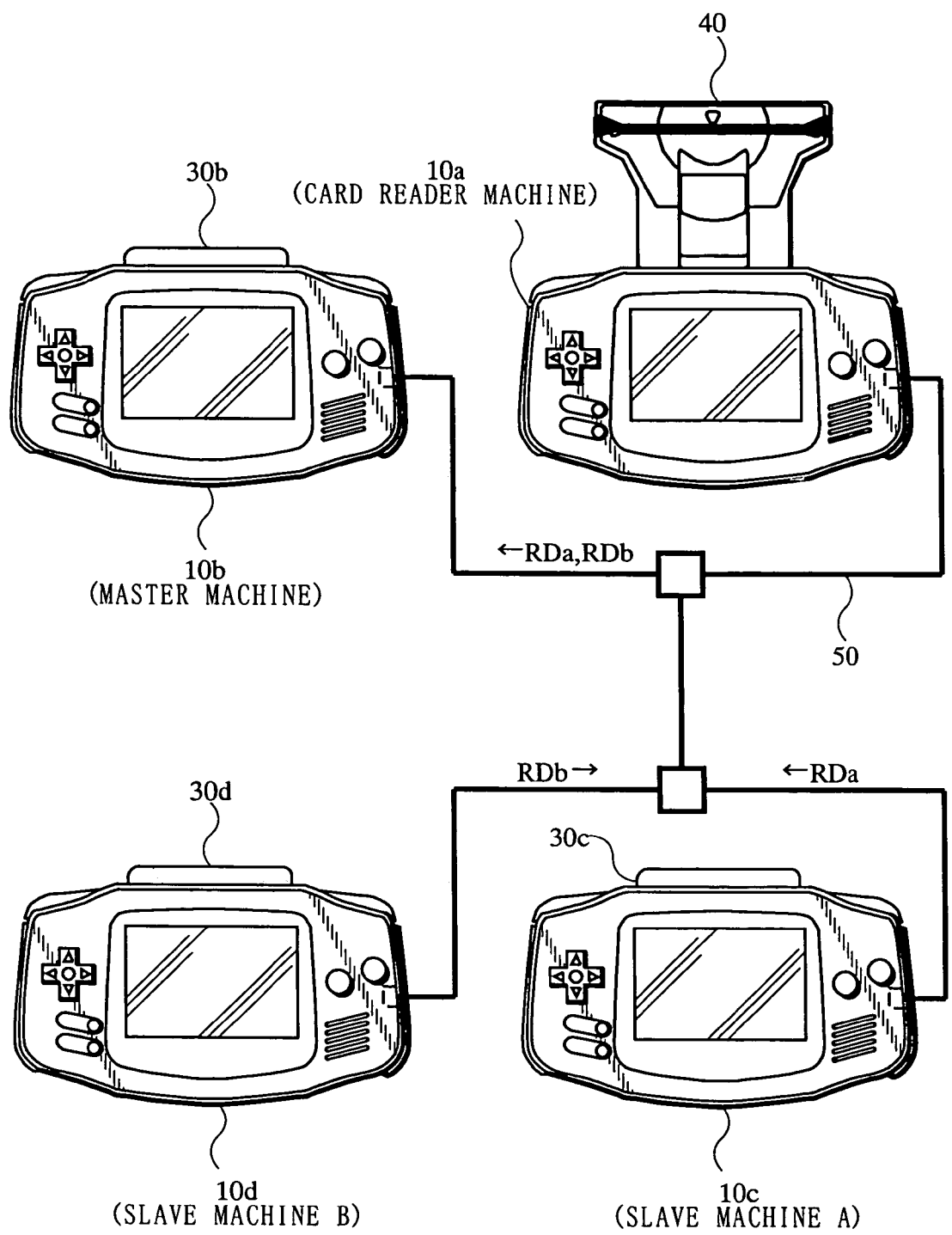
FIG. 11 is a diagram showing a state where result data RDa and RDb is sent to the game machine 10b (master machine) from the game machine 10c (slave machine A) and the game machine 10d (slave machine B), respectively.

Upon completion of the game processing at steps S4 and S12, the CPUs 21 of the slave machines A and B send their respective game processing results to the master machine (step S13). The CPU 21 of the master machine then collects the game processing results having been sent from the slave machines A and B (step S5). Specifically, the CPUs 21 of the slave machines A and B send, to the master machine, their respective game processing results, as result data RDa and RDb, through the communication cable 50. Then, the CPU 21 of the master machine collects the result data RDa and RDb, having been sent from the slave machines A and B. FIG. 11 shows a state where the result data RDa and RDb is sent to the game machine 10b (master machine) from the game machine 10c (slave machine A) and the game machine 10d (slave machine B), respectively. Note that where in the game processing at steps S4 and S12 the master machine and the slave machines send and receive their respective operation data OD to and from each other and compete against each other in a game, the CPU 21 of the master machine can obtain the game processing results of the slave machines A and B in the game processing; therefore in this case, it is not necessary to send and collect the game processing results.

Subsequently, the CPU 21 of the master machine compares the game processing results of the master machine and the slave machines A and B and determines the rankings of the game machines (step S6). The CPU 21 of the master machine then determines, based on the determination results (e.g., the winner of the game) at step S6, a game machine 10 to receive the card data CD and sends the card data CD to the determined game machine 10 (step S7).

Figure 12:
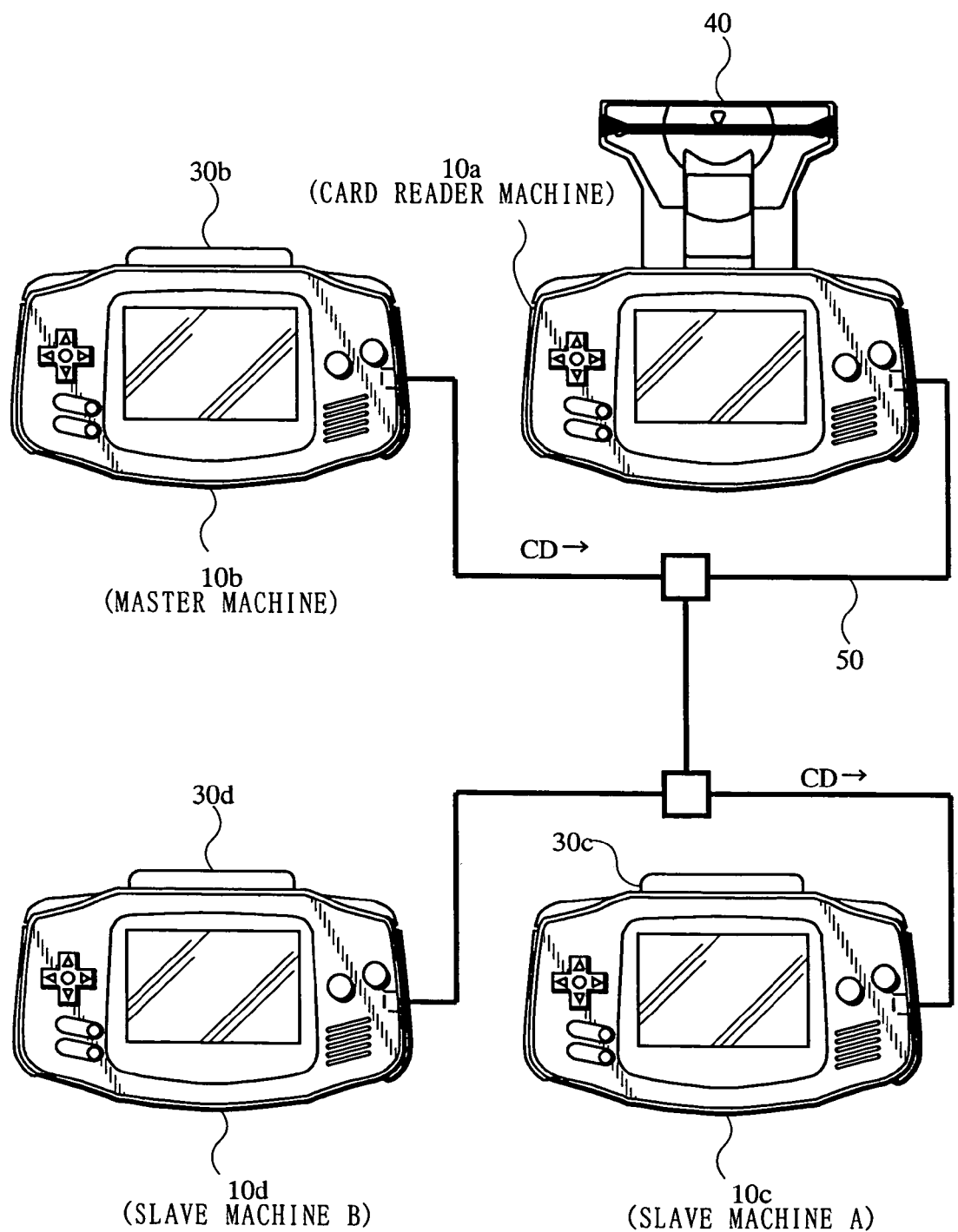
FIG. 12 is a diagram showing a state where the card data CD is sent to the game machine 10c (slave machine A) from the game machine 10b (master machine).

Meanwhile, the CPUs 21 of the slave machines A and B wait for the card data CD to be sent from the master machine (step S14). In the case of a slave machine having received the card data CD, the CPU 21 of the slave machine performs the process of receiving the card data (step S15) and completes the processing shown in the flowchart. The slave machine, having received the card data CD, then stores the card data CD in the card data buffer as special prize data which can be used only by that machine. FIG. 12 shows a state where the card data CD is sent to the game machine 10c (slave machine A) from the game machine 10b (master machine).

The master machine, having sent the card data CD at step S7, may have the right to receive the card data CD (i.e., in the process of determining game results at step S6, the master machine may be determined to be the one to receive the card data CD). Therefore, the CPU 21 of the master machine also waits to receive the card data CD (step S8). If the CPU 21 of the master machine has received the card data CD, the CPU 21 of the master machine performs the process of receiving the card data CD (step S9) and completes the processing shown in the flowchart. Specifically, in the case where the master machine performs the process of receiving card data CD, the card data CD is temporarily delivered to the communication cable 50 from the sending data buffer of the master machine at step S7, and the delivered card data CD is stored in the receiving data buffer of the master machine at step S9. The master machine, having received the card data CD, also stores the card data CD in the card data buffer as special prize data which can be used only by that machine.

As described above, according to the game system of the present embodiment, since card data is sent only to a specific game machine(s) among a plurality of game machines which are communicably connected to each other, based on game results, an amusing game is achieved which uses card data to be sent as special prize data which is given only to a specific player(s). In addition, even in the operation of reading a card by a card reader machine, nobody knows which game machine will acquire card data, and thus the operation of reading the card itself provides a fun experience. Accordingly, all players who operate game machines connected to the game system can enjoy an amusing game.

The card data may be data that can be used only in a game machine which has performed the aforementioned game processing and received the data. For example, the card data may be set with a flag, which is cleared upon reception of the data after performing the aforementioned game processing, whereby only card data whose flag has been cleared can be used in a game machine. Accordingly, the value of the special prize contained in the card data is increased and the aforementioned game becomes more amusing.

Although in the aforementioned game system there is described an exemplary construction in which a plurality of portable game machines are connected to each other, the game system may be constructed by a combination of a portable game machine and a non-portable game machine. For example, the aforementioned card reader machine (a portable game machine) and a non-portable game machine having a plurality of controllers connected thereto are connected to each other through a communication cable. Then, card data read by the card reader machine is provided to the winner of a game played using the plurality of controllers, whereby an amusing game can be realized as is the case described above.

Moreover, although in the above-described embodiment, a game cartridge is used as an information storage medium for a game program, etc., a storage medium for storing a game program of the illustrative embodiments may be in other formats. For example, in the case where the game program of the illustrative embodiments is executed by a non-portable game machine, the game program may be stored in an optical disk or the like, read from the optical disk, and then executed in the same manner as above. In addition, the game program may be provided through other media or communication lines.

While the invention has been described in detail, the foregoing description is in all aspects illustrative and not restrictive. It is understood that numerous other modifications and variations can be devised without departing from the scope of the invention.

What is claimed is:

1. A game system having a data reading apparatus and a plurality of game machines which are communicably connected to each other through a communication cable, comprising:
   a master/slave setting mechanism which sets, among the plurality of game machines, a game machine with authority to start communication as a master machine and sets the other game machines as slave machines,
   wherein the plurality of game machines each comprise:
   an operation input mechanism which inputs operation data in response to an operation by a player;
   a communicator which sends and receives data to and from other game machines and the data reading apparatus through the communication cable; and
   a game processor which processes a game in accordance with the operation data input from the operation input mechanism, and
   wherein the game machine set as the master machine comprises:
   a read data acquisition mechanism which acquires, through the communicator, data read into the data reading apparatus, the master machine being the only game machine from among the master and slave machines which acquires the data read into the data reading apparatus prior to start of the game;
   a game start instructor which instructs the other game machines to start the game, through the communicator;
   a determination mechanism which determines a game machine from among the master and slave machines to which the read data acquired by the read data acquisition mechanism is to be sent, based on processing results of the game processed by each game processor; and
   a data transmitter which sends the read data acquired by the read data acquisition mechanism to the game machine determined by the determination mechanism through the communicator.

2. The game system according to claim 1, wherein
   the game machines set as the slave machines each further comprise game processing result transmitters which send a processing result of the game processed by the game processor to the game machine set as the master machine through the communicator, and
   the game machine set as the master machine further comprises a result collector which collects the processing results of the game having been sent from each game processing result transmitter.

3. The game system according to claim 1, wherein
   the data reading apparatus includes:
   a card reader which generates card data by mechanically reading a data storage region of a card, the data storage region having stored therein data and being provided on a main surface of the card, and
   the read data acquisition mechanism acquires the card data generated by the card reader as the read data.

4. The game system according to claim 3, wherein the data reading apparatus is a game machine having the card reader installed thereon.

5. The game system according to claim 1, wherein
   the read data acquisition mechanism transfers a read data sending program to the data reading apparatus, and
   the data reading apparatus executes the read data sending program to send the read data to the game machine set as the master machine.

6. A storage medium for storing a game program to be executed by computers of a plurality of game machines, the game machines and a data reading apparatus being communicably connected to each other through a communication cable, the game program allowing each computer to execute the steps of:
   a master/slave setting step of setting, among the plurality of game machines, a game machine with authority to start communication as a master machine and setting the other game machines as slave machines; and
   a game processing step of processing a game in accordance with operation data in response to an operation by a player,
   wherein if a game machine is set as the master machine at the master/slave setting step, the game program allows the computer of the game machine to execute:
   a read data acquisition step of acquiring, through the communication cable, data read into the data reading apparatus, the master machine being the only game machine from among the master and slave machines which acquires the data read into the data reading apparatus prior to start of the game;
   a game start instruction step of instructing the other game machines to start the game through the communication cable;
   a determination step of determining a game machine to which the read data acquired at the read data acquisition step is to be sent, based on processing results of the game processed by the computers of the plurality of game machines at the game processing step; and
   a data sending step of sending the read data acquired at the read data acquisition step to the game machine from among the master and slave machines determined at the determination step through the communication cable.

7. The storage medium according to claim 6, wherein
if a game machine is set as the slave machine at the master/slave setting step, the game program further allows the computer of the game machine to execute a game processing result sending step of sending a processing result of the game processed at the game processing step to the game machine set as the master machine through the communication cable, and
if a game machine is set as the master machine at the master/slave setting step, the game program further allows the computer of the game machine to execute a result collection step of collecting the processing results of the game having been sent from the game machines set as the slave machines.

8. The storage medium according to claim 6, wherein
the data read into the data reading apparatus is card data generated by mechanically reading a data storage region of a card, the data storage region having stored therein data and being provided on a main surface of the card, and
the read data acquisition step acquires the card data as the read data.

9. The storage medium according to claim 6, wherein
the read data acquisition step includes a step of transferring, to the data reading apparatus, a read data sending program for sending the read data, and
the read data acquisition step acquires the read data through the communication cable, by executing the read data sending program to send the read data to the game machine set as the master machine.

10. In a game system having a plurality of game machines and a card reader, a method comprising:
reading card data from at least one card with the card reader;
setting one of the game machines as a master game machine and a remainder of the game machines as slave game machine(s);
transmitting the card data from the card reader to the master game machine so that the master game machine is the only one of the game machines which receives the card data prior to start of a game;
starting the game;
processing results of the game to determine at least one game machine from among the master and slave game machines; and
sending the card data from the master game machine to the determined game machine.

11. The method of claim 10, wherein the determined game machine has been deemed a winner of the game.

12. The method of claim 10, wherein the card data corresponds to prize data.

13. The method of claim 10, wherein only the determined game machine from among the plurality of game machines may use the card data after being sent from the master game machine.

14. The method of claim 10, further comprising:
transferring a data transmission program from the master game machine to the card reader; and
executing the transferred data transmission program at the card reader to perform the transmitting of the card data from the card reader to the master game machine.

15. In a game system having a plurality of game machines and a card reader, one of the game machines having been set as a master game machine and a remainder of the game machines having being set as slave game machine(s), a method of operating the master game machine comprising:
receiving card data from the card reader so that only the master game machine from among the master and slave game machines receives the card data prior to start of a game;
storing the card data;
starting the game, the game involving respective users of the master and slave game machines competing against one another;
processing results of the game;
determining a winning game machine from among the master and slave game machines based on the results of the game; and
sending the card data to the winning game machine.

16. The method of operating the master game machine as in claim 15, wherein the card data corresponds to prize data.

17. The method of operating the master game machine as in claim 15, wherein only the winning game machine from among the plurality of game machines may use the card data after the card data is sent to the winning game machine.

18. The method of operating the master game machine as in claim 15, further comprising transferring a data transmission program to the card reader for execution by the card reader so that the card data may be received.

* * * * *